(12) United States Patent
Czajkowski et al.

(10) Patent No.: US 7,774,756 B1
(45) Date of Patent: Aug. 10, 2010

(54) METHOD AND SYSTEM FOR CREATING A LOGICAL VIEW OUT OF REMOTE METHOD INVOCATIONS

(75) Inventors: Grzegorz Jan Czajkowski, Mountain View, CA (US); Laurent Philippe Daynès, Saint-Ismier (FR)

(73) Assignee: Oracle America, Inc., Redwood City, CA (US)

( * ) Notice: Subject to any disclaimer, the term of this patent is extended or adjusted under 35 U.S.C. 154(b) by 1372 days.

(21) Appl. No.: 11/220,437

(22) Filed: Sep. 7, 2005

(51) Int. Cl.
*G06F 9/44* (2006.01)

(52) U.S. Cl. .................. 717/124; 717/127; 717/131

(58) Field of Classification Search ............... None
See application file for complete search history.

(56) References Cited

U.S. PATENT DOCUMENTS

2003/0233634 A1* 12/2003 Carrez et al. .............. 717/124

* cited by examiner

*Primary Examiner*—Chuck O Kendall
(74) *Attorney, Agent, or Firm*—Osha • Liang LLP

(57) ABSTRACT

A method for debugging an application on a source node, that includes creating a first Remote Method Invocation (RMI) by the application at a source node, associating a first debug object with the first RMI, sending the first RMI with the first debug object to a first target node, and receiving debugging information from the first target node, wherein the debugging information is obtained by executing the first RMI on the first target node.

18 Claims, 5 Drawing Sheets

METHOD AND SYSTEM FOR CREATING A LOGICAL VIEW OUT OF REMOTE METHOD INVOCATIONS

BACKGROUND

A distributed computer system typically includes multiple interconnected nodes. On each node in the distributed computer system, one or more applications may be executing through the use of one or more threads, where an application corresponds to a set of computer instructions which may be executed by one or more threads. Further, an application may include one or more methods. The method may have zero or more input parameters and generates output using the zero or more input parameters. The input parameters may include objects.

Often in a distributed computer system, a method in an application on one node may use the functionality of a method of an application on another node through a remote method invocation (RMI). A RMI allows a method in an application on a source node to request functionality of a target node in a manner similar to a standard method call in which a method calls another method on the same node. Specifically, after the initial steps of connecting the source node to the target node, a thread executing a method in an application on the source node may request a RMI (including the necessary input parameters). Before sending the RMI to the target node, the source node may serialize the objects, if the input parameters of the RMI include objects (i.e., transform the objects into a byte stream).

After the objects are serialized, the objects are sent with the RMI to the target node using protocols known in the art (e.g., Transport Control Protocol (TCP), Internet Protocol (IP)). Upon receiving the RMI, the target node may deserialize the objects. Once the objects are deserialized, the target node may process the RMI by instantiating an instance of the application that includes the method requested in the RMI. After the instance of the application has been instantiated, the method is executed and the result of the executing the method is sent to the application on the source node.

In order to ensure that an application is functioning properly, a debugger may be associated with the application. A debugger is an application that monitors the execution of the application instructions performed by the threads during the execution of the application as well as the state of memory during execution of the application. Thus, the debugger and/or a user is able to determine the points of failure, or bugs, in an application.

When RMIs are used, the debugger associated with the application should be able to determine the instructions performed by the target node as a result of the RMI. Specifically, a debugger should show the execution path (i.e., the instructions performed by multiple nodes which result from the execution of an application on the source node) to enable the user to determine possible points of failure in the execution path. For example, if an application executing on a source node sends a RMI to a target node and fails, the debugger should be able to differentiate between whether the RMI was not sent properly by the application, whether the RMI did not arrive at the target node, whether an error exists at the target node, or whether the result was not able to be received properly.

As a further complication, there are often several threads simultaneously executing the same method on the target node as a result of several RMIs. During execution, remote threads (i.e., the threads on a target node) do not identify the thread(s) on a source node whose initiation of the RMI created the remote threads. Accordingly, debuggers executing on both the source and the target nodes are unable to match the threads executing on the source node with the thread(s) executing on the target node due to the RMI from the source node. Thus, a debugger is unable to determine the instructions performed by the target node as a result of the RMI in order to determine all possible points of failure.

One method for debugging in a distributed computer system having RMIs is for a user to execute the application with the debugger first on the source node. Upon executing the RMI, the debugger may merely log that the RMI is being executed. The user may then execute the method of the RMI on the target node with a separate debugger. In this solution, because the debuggers on the source node and the target node have no means to communicate with each other, the debuggers are unable to match the threads. Accordingly, a user debugging an application on the source node is unable to follow all of the instructions resulting from the application on the source node.

SUMMARY

In general, in one aspect, the invention relates to a method for debugging an application on a source node, that includes creating a first Remote Method Invocation (RMI) by the application at a source node, associating a first debug object with the first RMI, sending the first RMI with the first debug object to a first target node, and receiving debugging information from the first target node, wherein the debugging information is obtained by executing the first RMI on the first target node.

In general, in one aspect, the invention relates to a system for debugging an application, that includes the application configured to execute on the source node, and a first debugger for debugging the application configured to intercept an first RMI from the application on the source node, determine whether the first RMI comprises a first argument, wrap the first argument with a first debug object wrapper to obtain the first debug object if the first RMI comprises the first argument, create the first debug object without the first argument if the first RMI does not comprise the first argument, and send the first RMI with the debug object to a first target node.

In general, in one aspect, the invention relates to a computer readable medium that includes software instructions for debugging an application on a source node that includes software instructions for creating a first Remote Method Invocation (RMI) by the application at a source node, associating a first debug object with the first RMI, sending the first RMI with the first debug object to a first target node, and receiving debugging information from the first target node, wherein the debugging information is obtained by executing the first RMI on the first target node.

Other aspects of the invention will be apparent from the following description and the appended claims.

DETAILED DESCRIPTION

Figure 1:
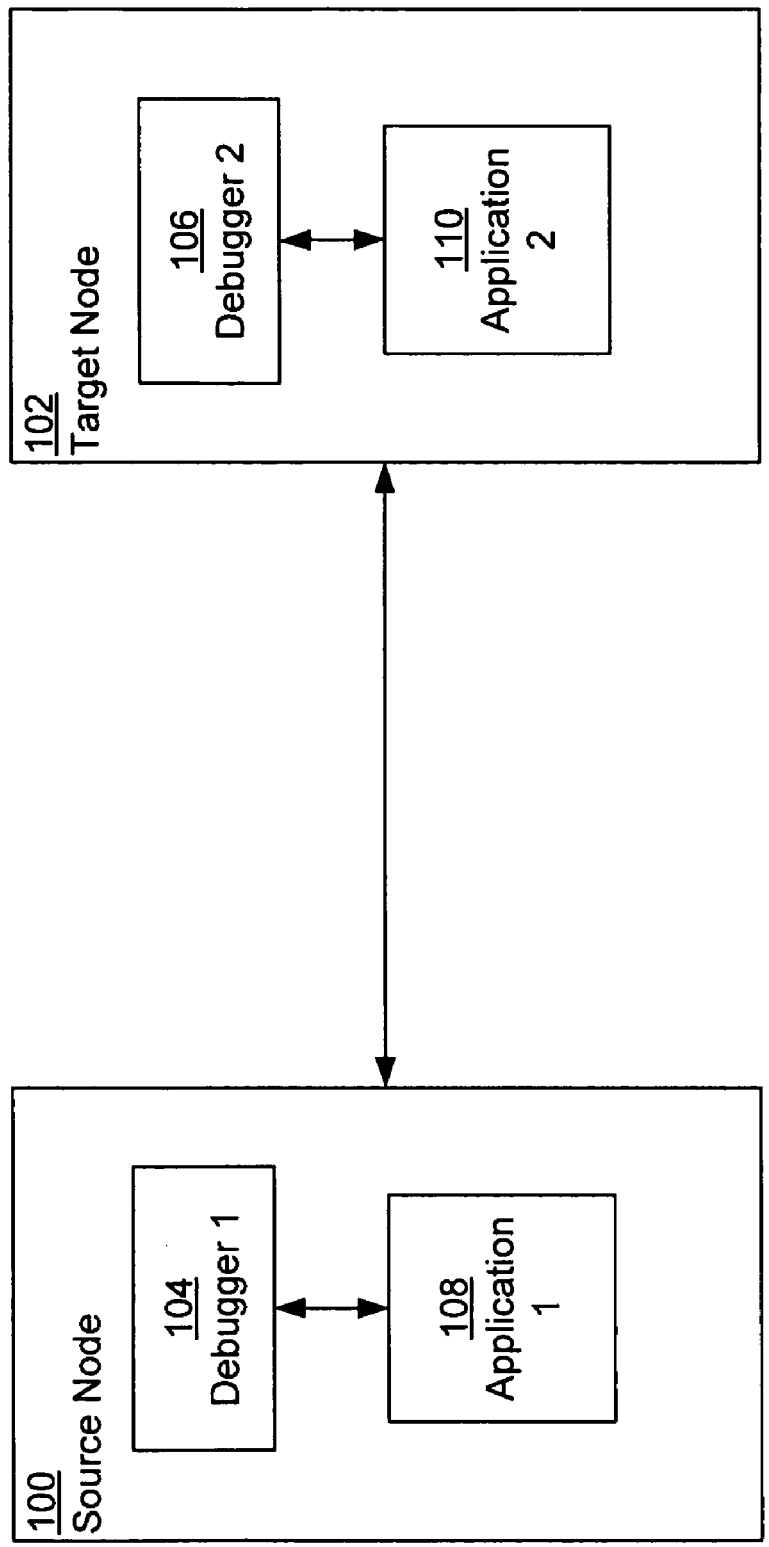
FIG. 1 shows a system for debugging an application in accordance with one embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for debugging an application in a distributed computer system. Specifically, embodiments of the invention allow a user to follow all of the instructions resulting from the application on the source node, regardless of whether the instructions execute on the source node or the target node. More specifically, embodiments of the invention create a logical view out of a chain of Remote Method Invocations (RMI). Further, embodiments of the invention use a debug object to associate an application executing on a source node with an application executing on the target node. This functionality allows for debugging information to be passed between the applications. Additionally, embodiments of the invention avoid crashing a node which does not support the debug object.

FIG. 1 shows a system for debugging a remote call in accordance with one embodiment of the invention. FIG. 1 includes a source node (100), a target node (102), a debugger (104, 106), and an application (108, 110). Each of these aforementioned components is described below.

In accordance with one embodiment of the invention, each of the source node (100) and target node (102) corresponds to a device with a processor. For example, the source node (100) and/or the target node (102) may correspond to a server (e.g., a web server, a database server, a node on a multiprocessor system, etc.), a laptop, a desktop computer, a small client device (e.g., a Personal Digital Assistant, watch, cell phone, appliance), etc.

Further, the source node (100) and target node (102) may share memory or may be associated with associated separate memories. This allows for the source node (100) and target node (102) to communicate with each other directly or indirectly. For example, the source node (100) and target node (102) may include functionality to communicate with each other through the shared memory, through a direct connection, or through a network. Accordingly, the source node (102) and the target node (106) may also include functionality to perform any of the various routines known in the art for sending and receiving communication, such as sending and/or receiving RMIs (described below).

In accordance with one embodiment of the invention, the source node (100) and the target node (102) may each include an application (108, 110) and a debugger (104, 106). Alternatively, in some embodiments of the invention, the target node (102) may not include a debugger.

An application (108, 110), in one embodiment of the invention, corresponds to a set of computer instructions which may be executed by one or more threads executing on the node. Further, the application (108, 110) may be written in any object-oriented programming language, such as JAVA™, Smalltalk, Eiffel, Self, etc.

Further, the application (108, 110) may include one or more methods. Thus, a thread executing an application (108, 110) may execute one or more methods in the application. Further, the thread executing a method in the application may be the result of a RMI (described below).

Additionally, the application 1 (108) may include functionality to create and send a RMI to the target node (102). An RMI, in one embodiment of the invention, is a call from a node, such as the source node (100), for requesting operations to be performed on another node, such as the target node (102). The RMI may include one or more objects as the input parameters to the method of the application (108, 110) requested in the RMI.

Continuing with FIG. 1, a debugger (104, 106), in one embodiment of the invention, is an application (108, 110) which monitors the execution of the application (108, 110) on the node. Specifically, the debugger (104, 106) may be used to track and log the individual instructions performed by the threads during the execution of the application (108, 110). This functionality enables the debugger and/or the user of the debugger to determine the points of failure, or bugs, in the application (108, 110). Those skilled in the art will appreciate that the debugger (104, 106) may be associated with and monitor the distributed computer system as a whole, a single node, an application, a method, a particular thread, or any combination thereof.

Further, those skilled in the art will appreciate that the application (108, 110) may or may not be aware of the debugger (104, 106). In accordance with one embodiment of the invention, if the application (108, 110) is unaware of the debugger (104, 106), then the debugger (104, 106) may include functionality to instantiate the application (108, 110) and monitor the instructions that the application (108) performs. Further, debugger 1 (104) may include functionality to intercept the RMI and create a debug object. This allows for the debug object to be created and transferred from the source node (100) to the target node (102) transparently to the applications (108, 110).

In one' embodiment of the invention, the debug object may include an argument (i.e., an object created by the application 1 (108)), in the RMI and a wrapper for the argument. The argument, in accordance with one embodiment of the invention, corresponds to any type of object that an application 1 (104) may send in a RMI.

Further, the wrapper for the argument may contain the argument and information required to associate application 1 (108) with application 2 (110). Specifically, the aforementioned information may include information such as an identifier for the source node (100), a debugging session identifier for application 1 (108) which identifies the debugger (104) as the debugger (104) that is debugging the application 1 (108), an identifier of the thread of application 1 (108) executing the remote method invocation, a virtual machine identifier, etc.

Further, the wrapper of the debug object may also include the instructions necessary to determine whether debugger 2 (106), which supports the debug object exists on the target node (102). If a debugger does not exist on the target node (102), then the debug object may include the instructions to extract the argument (if an argument exists) in a manner transparent to application 2 (110).

The debug object, in one embodiment of the invention, enables the formation of an association between a thread executing application 1 (108), which has an RMI on the source node (100), with the thread executing an application 2 (110) as a result of the RMI on the target node (102). Accordingly, by using information passed in the debug object, a debugger (104, 106) may store the execution path resulting from executing application 1 (108). The execution path corresponds to the instructions performed by multiple nodes (100, 102) which result from the execution of an application 1 (108) on the source node (100).

Those skilled in the art will appreciate that some RMIs may not include an argument. In such scenarios, the debug object does not include an argument. Rather, in one embodiment of the invention, the debug object includes only the wrapper.

Those skilled in the art will appreciate that while FIG. 1 shows two nodes (100, 102), there may be several nodes (100, 102) in a chain of RMIs. For example, application 2 (110) may include functionality to create another RMI to another application (not shown). Accordingly, the target node (102) may be a source node as well as a target node.

Figure 2:
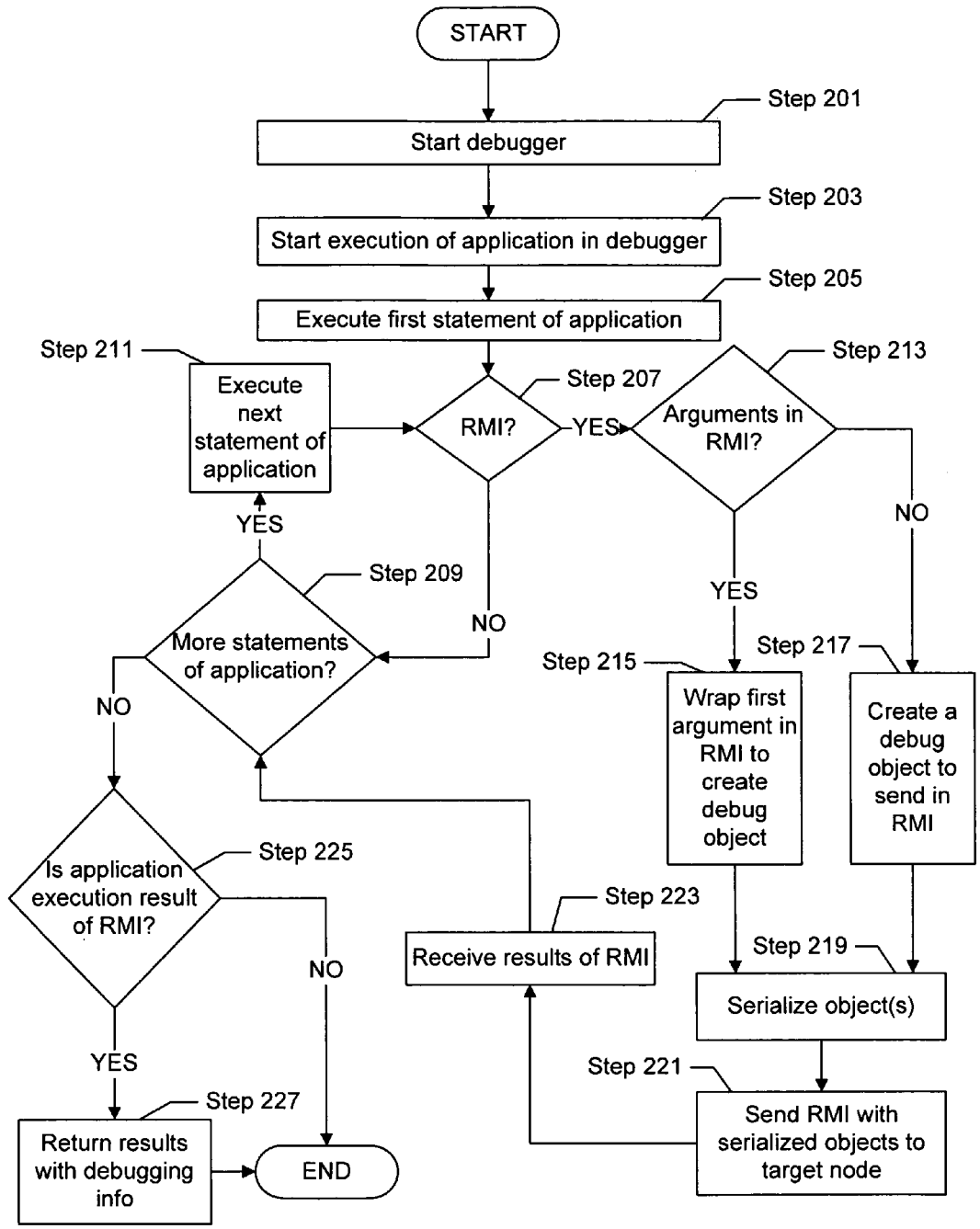
FIG. 2 shows a method for executing an application in a debugger in accordance with one embodiment of the invention.

FIG. 2 shows a method for executing an application in a debugger in accordance with one embodiment of the invention. Initially, in one embodiment of the invention, a debugger is started (Step 201). After starting the debugger, the execution of the application is started in the debugger (Step 203). By starting the application in the context of the debugger, the debugger may log and store the debugging information (e.g., the instructions performed by and as a result of the execution of the application, state of memory while executing the instructions, etc.). Thus, the debugger may store the execution path resulting from executing the application.

Next, the first statement of the application is executed (Step 205). While executing the first statement of the application is performed, a determination is made as to whether the statement includes a RMI (Step 207). If the first statement does not include an RMI, then a determination is made as to whether there are more statements of the application to execute (Step 209). If there are more statements in the application, then the next statement of the application is executed (Step 211). Alternatively, if the statement being executed includes a RMI (Step 207), then a determination is made as to whether there are one or more arguments in the RMI (Step 213).

In one embodiment of the invention, determining whether the statement includes a RMI and whether argument(s) are in the RMI may be performed, for example, by the debugger which may intercept the instructions before the instructions are executed. Further, those skilled in the art will appreciate that instructions for a RMI may include, for example, setting up a connection with a remote node, defining how objects in the RMI are to be serialized, sending the RMI to the socket layer, etc. Further, those skilled in the art will appreciate that at any stage of creating the RMI, the RMI may be intercepted by the debugger.

Continuing with FIG. 2, if there are argument(s) in the RMI, then in one embodiment of the invention, the first argument in the RMI is wrapped with the wrapper to create a debug object (Step 215). Those skilled in the art will appreciate that any or all arguments may be wrapped in the debug object. Further, wrapping an object in a debug object, may be performed, for example, by overriding the method for serializing an object to include a method for wrapping the argument as a preprocessing step.

Alternatively, if a determination is made that there are no arguments in the RMI (Step 213), then a debug object is created (i.e., an object including only a wrapper of the debug object) to send in the RMI (Step 217). After the debug object is created, the object(s) (e.g., the debug object and/or arguments) in the call are serialized (i.e., transforming the object(s) into a byte stream) to obtain serialized object(s) (Step 209). The serialized objects are then sent with the RMI to a target node (Step 211). Those skilled in the art will appreciate that sending the RMI with the object(s) may include, for example, partitioning the objects into datagrams or packet and sending the datagrams and packets using communication protocols well known in the art.

Continuing with FIG. 2, after the RMI is processed by the target node, the results of the RMI are received from the target node (Step 223). In one embodiment of the invention, if the target node has debugging support for the object, then the results may also include debugging information such as the instructions performed by the target node and any subsequent nodes along the execution path. Accordingly, the debugger may have access to the execution path resulting from executing the application. Once the results are received from the RMI, a determination is made as to whether there are more statements of the application to execute (Step 209). If there are more statements of the application to execute, then the application may continue executing in the context of the debugger. Continuing the execution of the application may include executing one or more additional RMIs.

Continuing with FIG. 2, if there are no more statements of the application to execute, then a determination is made as the whether the execution of the application is the result of an RMI (Step 225). If the execution of the application is a result of an RMI, then the results are returned to the source node of the RMI with the debugging information collected by the debugger (Step 227). Those skilled in the art will appreciate that if the execution of the application is the result of an RMI, the debugger may return the debugging information to the source node while the debugging information is collected rather than retuning the debugging information with the results. Further, the debugging information that is returned may also include information such as an identifier for the target node, a debugging session identifier for the debugger, an identifier of the thread used to execute the application, a virtual machine identifier, etc.

Those skilled in the art will appreciate that rather than collecting and returning debugging information, threads executing on the target node resulting from the executing of an application on the source node may be marked with an identifier of the thread requesting the RMI executing on the source node and the debugging session. Accordingly, a user or a debugger accessing the threads on both nodes is able to determine which threads result from executing an application on the source node. The user or debugger may then use the information to obtain a logical view of the chain of RMIs.

Continuing with FIG. 2, if the application execution is not the result of an RMI (Step 225), then the debugger completes executing. Completing the execution may include outputting a logical view of the chain of RMIs, outputting an execution path created by executing the application, analyzing the execution path to determine the points of failure in the execution path, etc.

Figure 3:
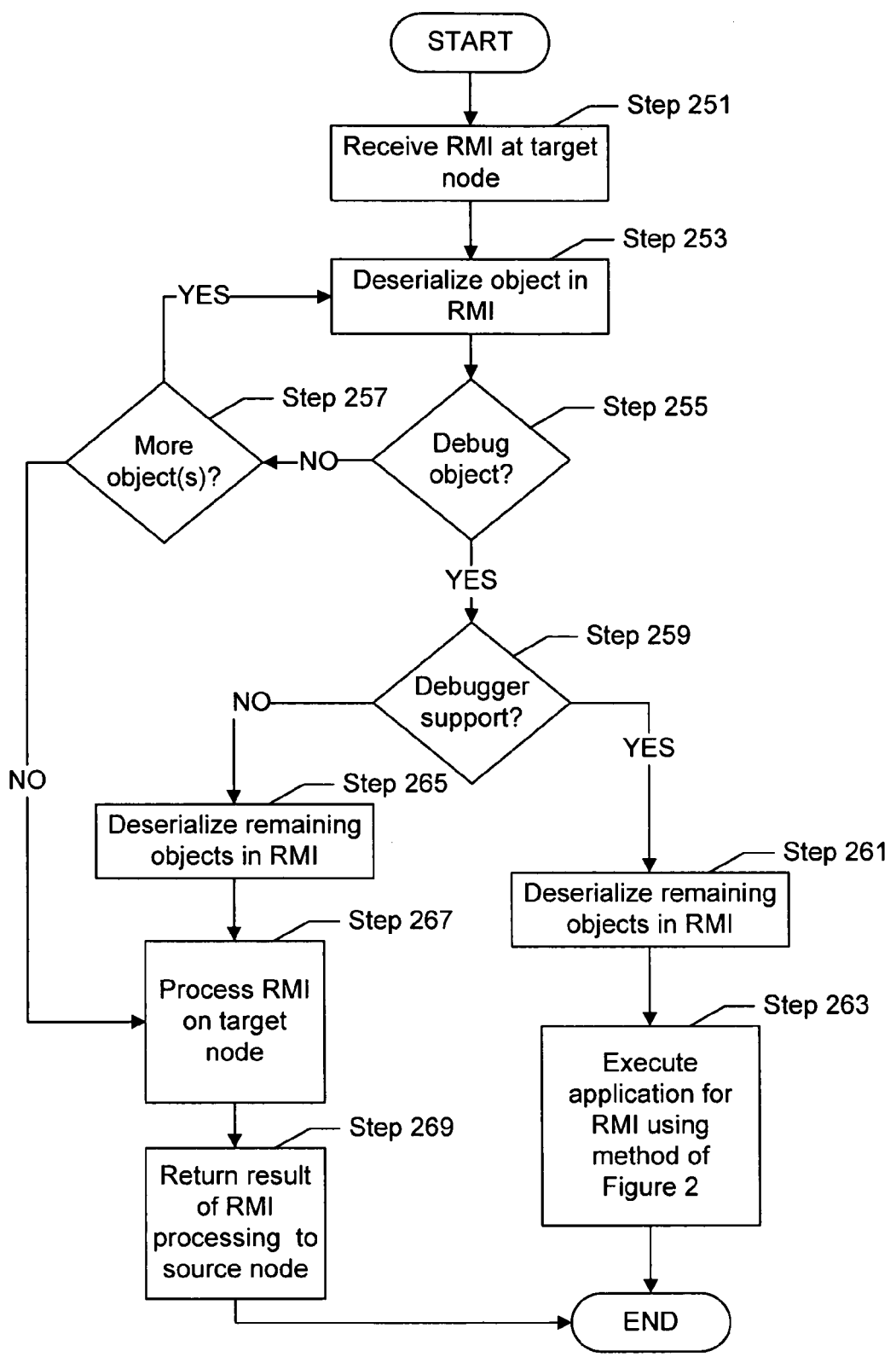
FIG. 3 shows a method for processing a Remote Method Invocation (RMI) on a target node in accordance with one embodiment of the invention.

FIG. 3 shows a method for processing an RMI in accordance with one embodiment of the invention. Initially, the RMI is received at the target node (Step 251). After receiving the RMI, object(s) in the RMI are deserialized (Step 253). Deserializing the serialized object, in accordance with one embodiment of the invention, involves reconstructing the object from the byte stream. Furthermore, deserializing the object may be performed in a manner that is transparent to an the application being called in the RMI.

While the object is being deserialized a determination is made as to whether the object is a debug object (Step 255). If the object is not a debug object, then a determination is made as to whether there are more objects in the RMI (Step 257). If there are no more objects in the RMI, then the RMI is processed by the target node (Step 267).

Alternatively, if there are more objects in the RMI, then the next object is deserialized. If the object being deserialized is a debug object, then a determination is made as to whether there is debugger support on the target node (Step 255).

Determining whether there is debugger support on the target node may be performed, for example, by testing whether a debugging property is set on the target node, determining whether a particular debugger is on the target node, etc.

In one embodiment of the invention, the debug object wrapper includes the instructions necessary to determine whether debugger support exists on the target node, obtain the argument (in scenarios in which the RMI included an argument), obtain the information required to associate the applications (as described above), etc. In one embodiment of the invention, the target node executes the aforementioned instructions as part of the deserialization process.

Continuing with FIG. 3, if debugger support is not available on the target node, then any remaining objects in the RMI are deserialized (Step 265) and the RMI is processed without any debugging support (Step 267). The result of the RMI is then returned to the source node (Step 269).

Alternatively, if there is debugging support on the target node, then the remaining objects in the RMI are deserialized and the application for the RMI is executed using the method described in FIG. 2.

In accordance with one embodiment of the invention, the aforementioned steps may be performed transparently to the programmer. Specifically, embodiments of the invention overwrite the serialize and deserialize methods to add in the debug object. Thus, when a programmer uses the serialize and deserialize method calls, the calls may be transparently replaced with the overridden serialize and deserialized methods to create a debug object. Accordingly, the debug object may be transported in the RMI thereby providing the target node with enough information so that either node may reconstruct a logical chain of RMIs.

Figure 4:
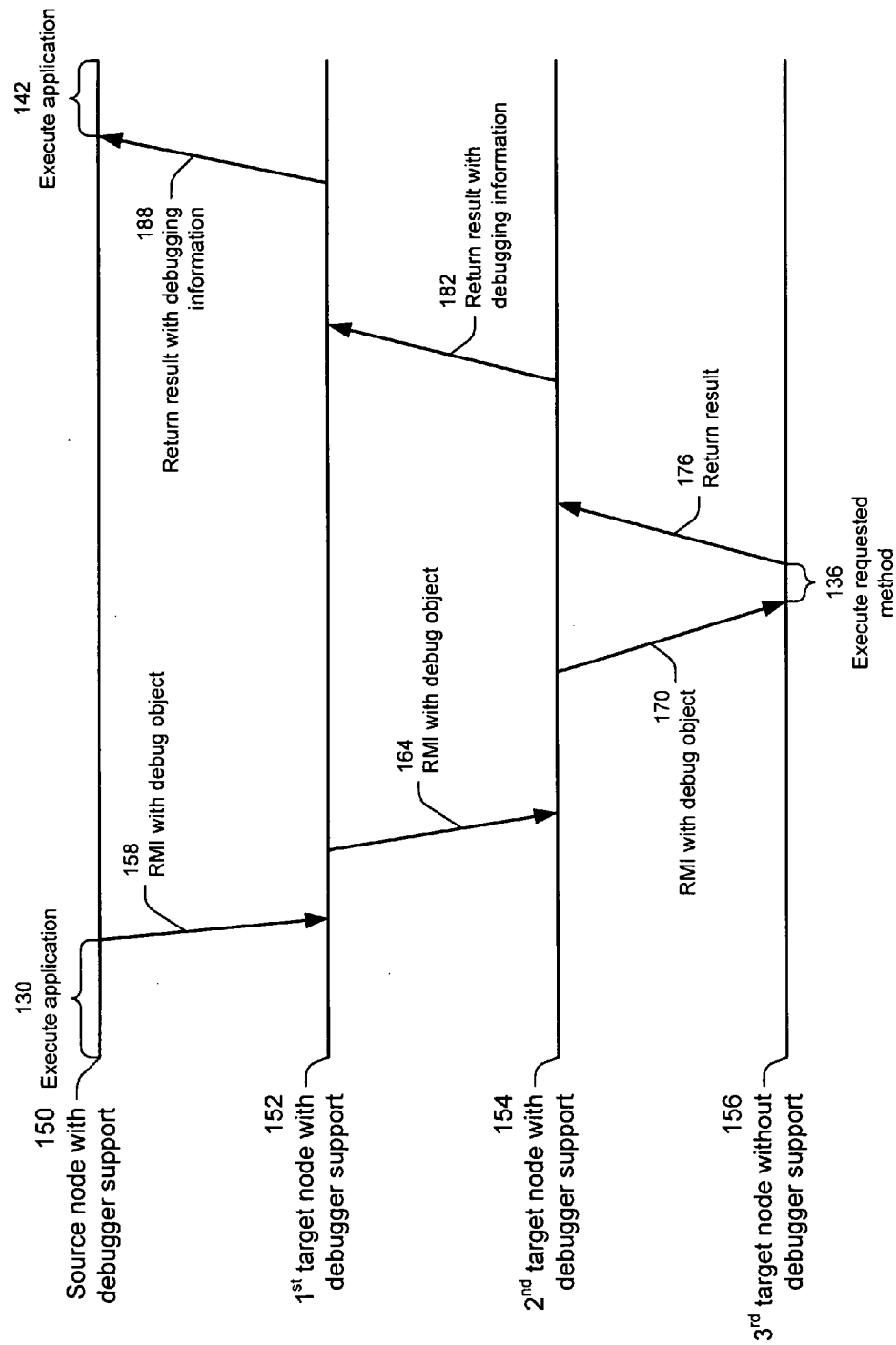
FIG. 4 shows an example of associating applications across several nodes through a debug object in accordance with one embodiment of the invention.

FIG. 4, shows an example of associating applications across several nodes through the debug object in accordance with one embodiment of the invention. For the purposes of this example, suppose four applications are located on four different nodes in the execution path (150, 152, 156, 158). Further, suppose that source node (150), the first target node (152), and the second target node (154) have the debugger support. Specifically, the source node (150), the first target node (152), and the second target node (154) have a debugger which is able to interpret a debugging object. However, the third target node (156) does not have the debugging support.

Initially, application 1 on the source node (150) is instantiated within the context of the debugger on the source node. Application 1 is subsequently executed (130). When an RMI instruction is encountered in application 1, the RMI is intercepted, a debug object is created, and the RMI (158) is sent with the debug object (and any additional arguments) to the first target node (152). Upon receiving the RMI (158), the debug object is deserialized and application 2, which includes the method requested in the RMI (158), is instantiated within the context of a debugger. Application 2 is subsequently executed on the first target node (152). At this stage, the debugger on the first target node (152) may begin gathering the debugging information resulting from the execution of application 2.

In this scenario, the method requested in the RMI (158), sent from the source node (150), also includes an RMI (164). When the RMI instruction is encountered in application 2, a debug object is created and the RMI (164) is sent with the debug object (and any additional arguments) to the second target node (154). Upon receiving the RMI (164), the debug object within the RMI (164) is deserialized and an application 3, which includes the method request in the RMI (164), is instantiated on the second target node (154) within the context of a debugger on the second target node (154). Application 3 is subsequently executed on the second target node (154). At this stage, the debugger on the second target node (154) may begin gathering the debugging information resulting from the execution of application 3. Those skilled in the art will appreciate that the debugging information gathered by the debugger on the second target node (154) is sent to the first target node (152), which in turn is forwarded to the source node (150).

Continuing with the example of FIG. 4, in this scenario, the method requested in the RMI (164) sent from the first target node (152) also includes an RMI (164). When an RMI instruction is encountered in application 3, the RMI is intercepted, a debug object is created, and the RMI (170) is sent with the debug object (and any additional arguments) to the third target node (156). Upon receiving the RMI (170), the debug object is deserialized. However, because the third target node does not have debugger support for the debugging object, application 4 on the third target node (156) is executed without the use of the debugger. When application 4 has completed execution (136) of the method requested in the RMI (170), application 4 returns the result of the execution (176) to application 3 on the second target node (154).

Upon receiving the results of the execution of application 4 (156), application 3 on the second target node (154) may execute additional instructions (as necessary) prior to returning the result with debugging information to application 2 on the first target node (152).

Upon receiving the results of the execution of application 3 (182), application 2 on the first target node (152) may execute additional instructions (as necessary) prior to returning the result with debugging information (188) to application 1 on the source node (150). Those skilled in the art will appreciate that the debugging information sent with the result (188) may include debugging information obtained from the second target node (154) and the first target node (152). Upon receiving the results (188) of the execution of application 2, application 1 on the source node (150) may continue to execute application 1 (142).

From the above example, the debugger on the source node is able to determine the execution path of application 1 on the source node. Specifically, the debugger may have debugging information from the execution of all the RMIs (158, 164, 170) as well as any other related debugging information to the extent the various target nodes (152, 156, 158) could gather such information.

Figure 5:
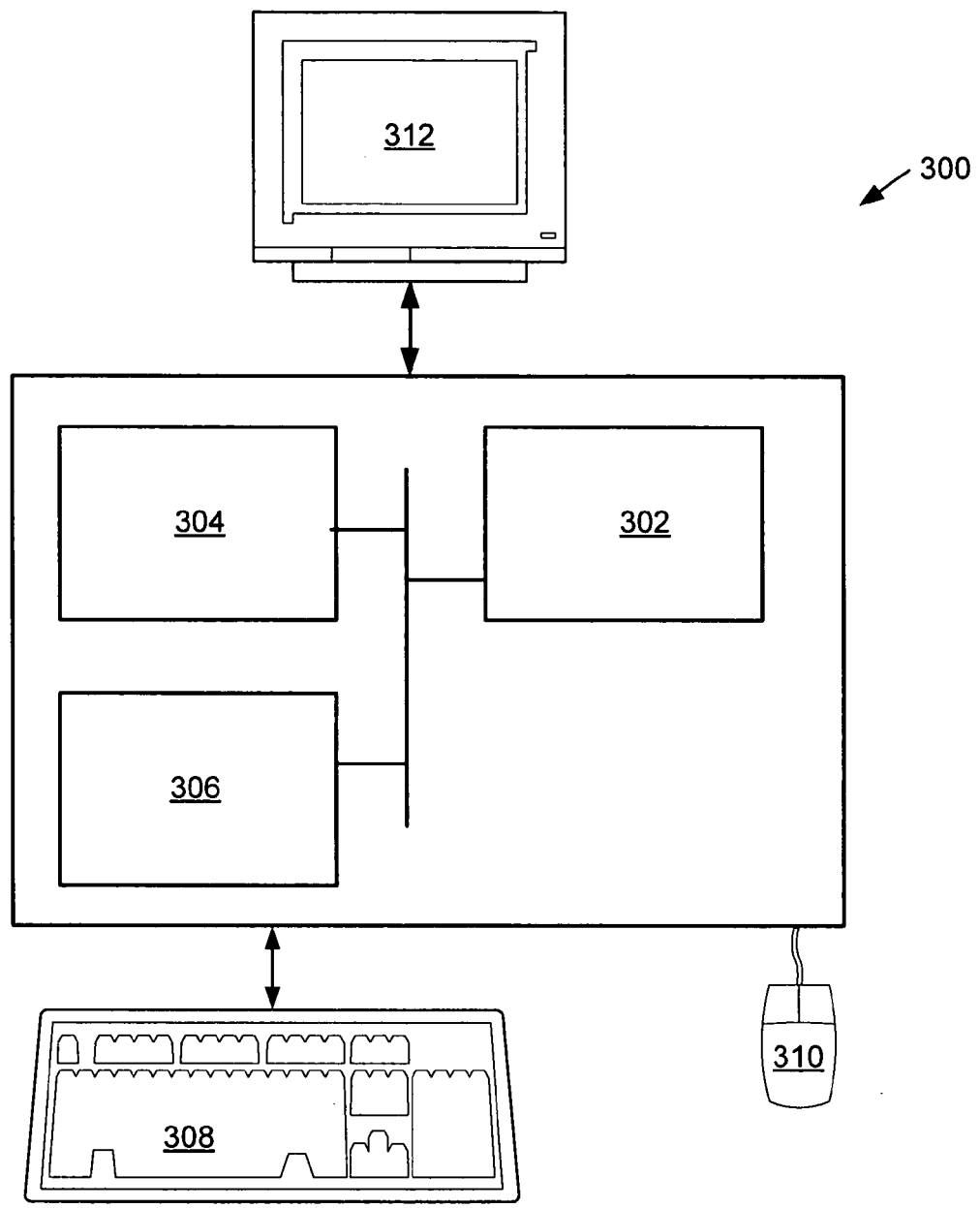
FIG. 5 shows computer system in accordance with one embodiment of the invention.

The invention may be implemented on virtually any type of computer regardless of the platform being used. For example, as shown in FIG. 5, a computer system (300) includes a processor (302), associated memory (304), a storage device (306), and numerous other elements and functionalities typical of today's computers (not shown). The computer (300) may also include input means, such as a keyboard (308) and a mouse (310), and output means, such as a monitor (312). The computer system (300) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (300) may be located at a remote location and connected to the other elements over a network. Further, the invention may be implemented on a distributed system having a plurality of nodes, where each portion of the invention (e.g., debugger(s), application(s), etc.) may be located on a different node within the distributed system. In one embodiment of the invention, the node corresponds to a computer system. Alternatively, the node may correspond to a processor with associated physical memory. Further, software instructions to perform embodiments of the invention may be stored on a computer readable medium such as a compact disc (CD), a diskette, a tape, or any other computer readable storage device.

One or more embodiments of the invention allow for creating a logical chain of execution which encompasses more than one node. Specifically, by creating an object which identifies the debugger on the source node with the debugger on the target node, the debugger on the target node is able to return to the source node any collected debugging information. Accordingly, a user on the source node may view the execution path spanning multiple nodes and the results from executing an application on the source node For example, if the path of execution halts during a RMI, then a user or debugger is able to determine whether the cause of the halt was due to a message not being sent correctly, the processing not being performed correctly at any of the nodes in the chain of execution, etc.

Furthermore, one or more embodiments of the invention enable debugging across multiple nodes without crashing (i.e., terminating execution of node(s) in the system) due to debugger's malfunction because of an unknown wrapper type object. Specifically, by creating a debug object which can determine whether debugging support is available and returned the argument if debugging support is not available in a manner transparent to the application on the target node, the target node will not halt execution because of having an unknown object. More specifically, embodiments of the invention provide support for either application which are endpoints of an RMI to execute under the control of the debugger in a manner transparent to the applications' programmers.

Additionally, one or more embodiments of the invention allow for the creation of a debug object in a manner transparent to the application on the source node. Specifically, by overriding the serialized method with a serialized method which first wraps the object with a wrapper to create a debug object, an application on the source node may use the serialized method without knowing that the serialized method has been replaced.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for debugging an application on a source node, comprising:
    creating a first Remote Method Invocation (RMI) by a first application executing on the source node;
    associating, by a first debugger executing on the source node, a first debug object with the first RMI;
    sending the first RMI with the first debug object to a first target node;
    determining, using the first debug object, that the first target node supports debugging;
    instantiating, in response to the determination, a second debugger on the first target node;
    executing, by a second application on the first target node, the first RMI;
    gathering, by the second debugger, debugging information during execution of the first RMI on the first target node;
    receiving debugging information from the first target node; and
    outputting a logical view of a chain of the first RMI.

2. The method of claim 1, further comprising:
    sending the debugging information to the source node using information in the first debug object.

3. The method of claim 2, further comprising:
    processing the debugging information by the first debugger.

4. The method of claim 1, further comprising:
    determining whether the first RMI comprises an argument; and
    wrapping the argument with a debug object wrapper to obtain the first debug object.

5. The method of claim 1, further comprising:
    determining whether the first RMI comprises an argument; and
    creating the first debug object without the argument.

6. The method of claim 1, further comprising:
    creating a second RMI by the second application at the first target node;
    associating a second debug object with the second RMI; and
    sending the second RMI with the second debug object to a second target node.

7. The method of claim 6, further comprising:
    instantiating a third debugger on the second target node in response to receiving the second debug object;
    executing the second RMI on the second target node;
    gathering second debugging information by the third debugger during execution of the second RMI on the second target node; and
    sending the second debugging information to the first target node using information in the second debug object.

8. The method of claim 1, wherein the first debug object comprises a debugging session identifier.

9. The method of claim 1, wherein the first debug object comprises a virtual machine identifier and a thread identifier.

10. A system for debugging an application, comprising:
    a source node comprising:
        a first processor,
        a first application executing on the first processor and configured to create a first Remote Method Invocation (RMI), and
        a first debugger, when executed on the first processor, is configured to:
            associate a first debug object with the first RMI,
            send the first RMI with the first debug object to a first target node,
            receive debugging information from the first target node, and
            output a logical view of a chain of the first RMI; and
    the first target node configured to receive the first RMI and the first debug object and comprising:
        a second processor,
        a second application executing on the second processor and configured to execute the first RMI, and
        a second debugger instantiated in response to receiving the first debug object and configured to gather debugging information during execution of the first RMI and send the debugging information to the first debugger.

11. The system of claim 10, wherein the second debugger is further configured to:
    intercept a second RMI from the second application on the first target node;
    determine whether the second RMI comprises an argument;

wrap the argument with a debug object wrapper to obtain the second debug object if the second RMI comprises the argument;

create the second debug object without the argument if the second RMI does not comprise the argument; and send the second RMI with the debug object to a second target node.

12. The system of claim 11, wherein the second debugger is further configured to:

receive debugging information from the second target node.

13. The system of claim 12, wherein the second debugger is further configured to:

send debugging information received from the second target node to the source node.

14. The system of claim 10, wherein the first debug object comprises a debugging session identifier.

15. The system of claim 10, wherein the first debug object comprises a virtual machine identifier and a thread identifier.

16. A tangible computer readable medium comprising software instructions for debugging an application on a source node comprising software instructions for:

creating a first Remote Method Invocation (RMI) by a first application executing on the source node;

associating, by a first debugger executing on the source node, a first debug object with the first RMI;

sending the first RMI with the first debug object to a first target node;

determining, using the first debug object, that the first target node supports debugging;

instantiating, in response to the determination, a second debugger on the first target node;

executing, by a second application on the first target node, the first RMI;

gathering, by the second debugger, debugging information during execution of the first RMI on the first target node;

receiving debugging information from the first target node; and outputting a logical view of a chain of the first RMI.

17. The tangible computer readable medium of claim 16, further comprising:

sending the debugging information to the source node using information in the first debug object.

18. The tangible computer readable medium of claim 16, further comprising:

determining whether the first RMI comprises an argument;

wrapping the argument with a debug object wrapper to obtain the first debug object if the first RMI comprises an argument; and creating the first debug object without the argument.

* * * * *